(12) United States Patent
Ogata et al.

(10) Patent No.: US 12,078,477 B2
(45) Date of Patent: Sep. 3, 2024

(54) MEASUREMENT DEVICE AND IMAGE FORMING APPARATUS

(71) Applicant: FUJIFILM Business Innovation Corp., Tokyo (JP)

(72) Inventors: Kenta Ogata, Kanagawa (JP); Kouhei Yukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 459 days.

(21) Appl. No.: 17/412,207

(22) Filed: Aug. 25, 2021

(65) Prior Publication Data
US 2022/0373326 A1    Nov. 24, 2022

(30) Foreign Application Priority Data

May 20, 2021  (JP) .................................. 2021-085625

(51) Int. Cl.
*G01B 17/02* (2006.01)
*G01N 29/07* (2006.01)

(52) U.S. Cl.
CPC ............ *G01B 17/02* (2013.01); *G01N 29/07* (2013.01); *G01N 2291/02854* (2013.01)

(58) Field of Classification Search
CPC ........ G01B 17/02; G01N 29/07; G01N 21/86; G01N 21/55; G01N 27/04; G01N 29/11; G01N 29/32; G01N 29/225; G01N 29/27; G01N 29/043; G01N 21/84; G01N 2021/555; G01N 2291/02854; G01N 2291/048; G01N 2291/0237;
(Continued)

(56) References Cited

U.S. PATENT DOCUMENTS 6,445,191 B1 *  9/2002  Trummer ................ F15B 15/12
                                                    324/635
7,421,217 B2 *  9/2008  Sugita ..................... H04N 1/40
                                                     399/72
(Continued)

FOREIGN PATENT DOCUMENTS

JP    2010049285    3/2010
JP    2011137774    7/2011

OTHER PUBLICATIONS

"Search Report of Europe Counterpart Application", issued on Apr. 29, 2022, p. 1-p. 8.

*Primary Examiner* — Jacques M Saint Surin
(74) *Attorney, Agent, or Firm* — JCIPRNET (57) ABSTRACT

A measurement device includes: a first measurement unit, disposed at a first opposing position facing a portion of a sheet-like measurement target, that measures a first physical property of the measurement target by causing the measurement target to vibrate with an ultrasonic wave; a second measurement unit, disposed at a second opposing position facing another portion of the measurement target in a state in which the first measurement unit is facing the first portion, that pinches and restrains the other portion in a thickness direction and measures a second physical property other than the first physical property of the measurement target; and a disposed unit disposed between the first measurement unit and the second measurement unit in an intersecting direction with respect to the thickness direction of the measurement target.

15 Claims, 5 Drawing Sheets

(58) Field of Classification Search
CPC ........... G01N 2021/8663; G01R 27/14; G01G 17/02; G01V 8/10
USPC .......................................................... 73/596
See application file for complete search history.

(56) References Cited

U.S. PATENT DOCUMENTS

| | | | |
|---|---|---|---|
| 7,481,526 B2* | 1/2009 | Inoue | B41J 13/02 |
| | | | 347/101 |
| 9,259,941 B2* | 2/2016 | Watanabe | B41F 23/00 |
| 9,432,538 B2* | 8/2016 | Kobayashi | G03B 27/50 |
| 11,345,558 B2* | 5/2022 | Egawa | G03G 15/6567 |
| 11,573,516 B2* | 2/2023 | Ogata | G03G 15/5054 |
| 11,586,136 B2* | 2/2023 | Eguchi | G03G 15/2046 |
| 11,774,893 B2* | 10/2023 | Ogata | G03G 15/5029 |
| | | | 399/45 |
| 11,796,948 B2* | 10/2023 | Ogata | B41J 11/009 |
| 2019/0265607 A1 | 8/2019 | Ishimoto et al. | |
| 2020/0192261 A1 | 6/2020 | Ogata et al. | |
| 2020/0240843 A1 | 7/2020 | Kanai et al. | |

* cited by examiner

MEASUREMENT DEVICE AND IMAGE FORMING APPARATUS

CROSS-REFERENCE TO RELATED APPLICATIONS

This application is based on and claims priority under 35 USC 119 from Japanese Patent Application No. 2021-085625 filed May 20, 2021.

BACKGROUND

(i) Technical Field

The present disclosure relates to a measurement device and an image forming apparatus.

(ii) Related Art

Japanese Unexamined Patent Application Publication No. 2011-137774 discloses a measurement terminal used to measure the resistance of a thin film using four-terminal sensing, in which the positions of the four measurement terminals are fixed such that the value obtained by dividing a measured voltage value by a current value is equal to the sheet resistance value of a thin film.

SUMMARY

A conceivable measurement device may be provided with a first measurement unit disposed at a position facing a portion of a sheet-like measurement target and configured to measure a first physical property of the measurement target, and a second measurement unit disposed at a position facing another portion of the measurement target in the state where the first measurement unit is facing the portion and configured to measure a second physical property other than the first physical property of the measurement target.

With this configuration, if noise occurs in the first measurement unit, the noise may propagate through the measurement target or space toward the second measurement unit and hinder the measurement by the second measurement unit in some cases.

Aspects of non-limiting embodiments of the present disclosure relate to minimizing the hindrance to the measurement by the second measurement unit caused by noise occurring in the first measurement unit compared to a configuration in which the first measurement unit and the second measurement unit are adjacent to each other in an intersecting direction with respect to the thickness direction of the measurement target.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

Note that the noise may be anything that hinders measurement by a measurement unit. Examples of noise include electromagnetic waves and vibrations.

According to an aspect of the present disclosure, there is provided a measurement device including: a first measurement unit, disposed at a first opposing position facing a portion of a sheet-like measurement target, that measures a first physical property of the measurement target by causing the measurement target to vibrate with an ultrasonic wave; a second measurement unit, disposed at a second opposing position facing another portion of the measurement target in a state in which the first measurement unit is facing the first portion, that pinches and restrains the other portion in a thickness direction and measures a second physical property other than the first physical property of the measurement target; and a disposed unit disposed between the first measurement unit and the second measurement unit in an intersecting direction with respect to the thickness direction of the measurement target.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described in detail on the basis of the drawings.

Figure 1:
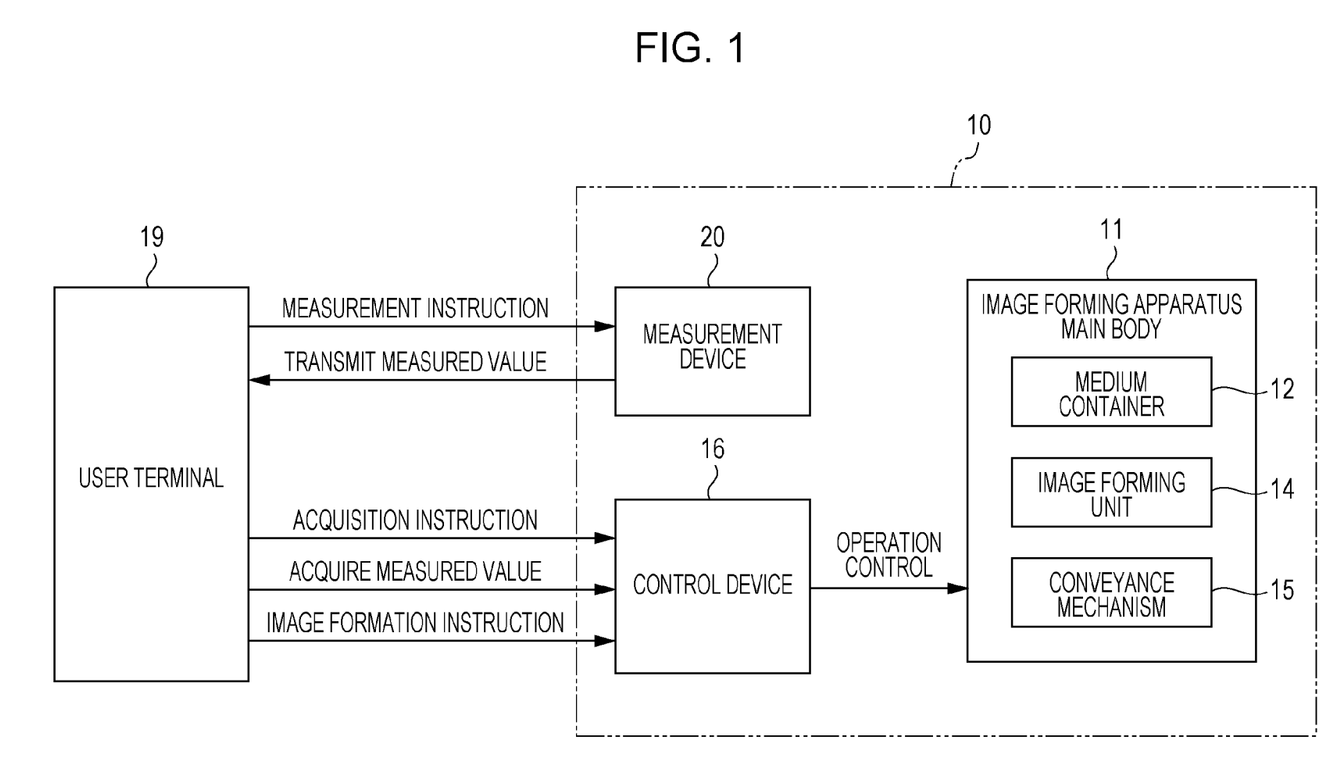
FIG. 1 is a block diagram illustrating a configuration of an image forming apparatus according to a first exemplary embodiment.

First Exemplary Embodiment (Image forming apparatus 10) A configuration of an image forming apparatus 10 according to the exemplary embodiment will be described. FIG. 1 is a block diagram illustrating a configuration of the image forming apparatus 10 according to the exemplary embodiment.

The image forming apparatus 10 illustrated in FIG. 1 is an apparatus that forms images. Specifically, as illustrated in FIG. 1, the image forming apparatus 10 is provided with an image forming apparatus main body 11, a medium container 12, an image forming unit 14, a conveyance mechanism 15, a control device 16, and a measurement device 20. The image forming apparatus 10 is capable of transmitting and receiving information with a user terminal 19. Hereinafter, each component of the image forming apparatus 10 will be described.

(Image Forming Apparatus Main Body 11)

The image forming apparatus main body 11 illustrated in FIG. 1 is a portion in which the components of the image forming apparatus 10 are provided. Specifically, the image forming apparatus main body 11 is a box-shaped housing, for example. In the exemplary embodiment, the medium container 12, the image forming unit 14, and the conveyance mechanism 15 are provided inside the image forming apparatus main body 11.

(Medium Container 12)

The medium container 12 illustrated in FIG. 1 is a portion that contains paper P in the image forming apparatus 10. The paper P contained in the medium container 12 is supplied to the image forming unit 14. Note that the paper P is one example of a "recording medium".

(Image Forming Unit 14)

The image forming unit 14 illustrated in FIG. 1 includes a function of forming an image on the paper P supplied from the medium container 12. Examples of the image forming unit 14 include an inkjet image forming unit that forms an image on the paper P using ink, and an electrophotographic image forming unit that forms an image on the paper P using toner.

In an inkjet image forming unit, an image is formed on the paper P by ejecting ink droplets from nozzles onto the paper P. In an inkjet image forming unit, an image may also be formed on the paper P by ejecting ink droplets from nozzles onto a transfer medium, and then transferring the ink droplets from the transfer medium to the paper P.

In an electrophotographic image forming unit, an image is formed on the paper P by performing the steps of charging, exposing, developing, transferring, and fusing, for example. In an electrophotographic image forming unit, an image may also be formed on the paper P by performing the charging, exposing, developing, and transferring steps to form an image on a transfer medium, transferring the image from the transfer medium to the paper P, and then fusing the image to the paper P.

Note that examples of the image forming unit are not limited to the inkjet image forming unit and the electrophotographic image forming unit described above, and any of various types of image forming units may be used.

(Conveyance Mechanism 15)

The conveyance mechanism 15 illustrated in FIG. 1 is a mechanism that conveys the paper P. As an example, the conveyance mechanism 15 conveys the paper P with conveyor members (not illustrated) such as conveyor rollers and conveyor belts. The conveyance mechanism 15 conveys the paper P from the medium container 12 to the image forming unit 14 along a predetermined conveyance path.

(Overview of User Terminal 19, Control Device 16, and Measurement Device 20)

The user terminal 19 illustrated in FIG. 1 is a terminal such as a smartphone, a tablet, or a personal computer, for example. The user terminal 19 is capable of communicating with the measurement device 20 and the control device 16 in a wired or wireless manner. As illustrated in FIG. 1, the measurement device 20 and the control device 16 are provided outside the image forming apparatus main body 11, for example. Note that each of the user terminal 19 and the control device 16 includes a control unit (control board) including a recording unit such as storage storing a program and a processor that operates according to the program.

In the exemplary embodiment, an operator (that is, a user) of the image forming apparatus 10 places desired paper P on which to form an image in the measurement device 20, and issues a measurement instruction from the user terminal 19, for example. The measurement device 20 acquires the measurement instruction from the user terminal 19, measures physical properties of the paper P, and transmits measured value information indicating measured values of the physical properties to the user terminal 19.

The operator (that is, the user) of the image forming apparatus 10 puts the paper P measured by the measurement device 20 into the medium container 12, and issues an acquisition instruction and an image formation instruction from the user terminal 19, for example. Note that the image formation instruction may also double as the acquisition instruction.

The control device 16 acquires the acquisition instruction from the user terminal 19 and acquires the measured value information from the user terminal 19. The control device 16 acquires the image formation instruction from the user terminal 19 and causes the image forming unit 14 and the conveyance mechanism 15 to execute image formation operations while also controlling the operations of the image forming unit 14 and the conveyance mechanism 15 on the basis of the measured value information. Specifically, the control device 16 controls settings such as the conveyance speed of the paper P in the conveyance mechanism 15 and also the transfer voltage and fusing temperature in the image forming unit 14 on the basis of the measured value information.

Note that in the example described above, the control device 16 is provided outside the image forming apparatus main body 11, but the control device 16 may also be provided inside the image forming apparatus main body 11. Additionally, the control device 16 acquires the measured value information from the measurement device 20 through the user terminal 19, but the control device 16 may also be configured to acquire the measured value information directly from the measurement device 20.

Furthermore, the measurement device 20 is provided outside the image forming apparatus main body 11, but the measurement device 20 may also be provided inside the image forming apparatus main body 11. Specifically, the measurement device 20 may also be configured as a device that measures physical properties in the medium container 12 or on the conveyance path of the paper P.

(Specific Configuration of Measurement Device 20)

Figure 2:
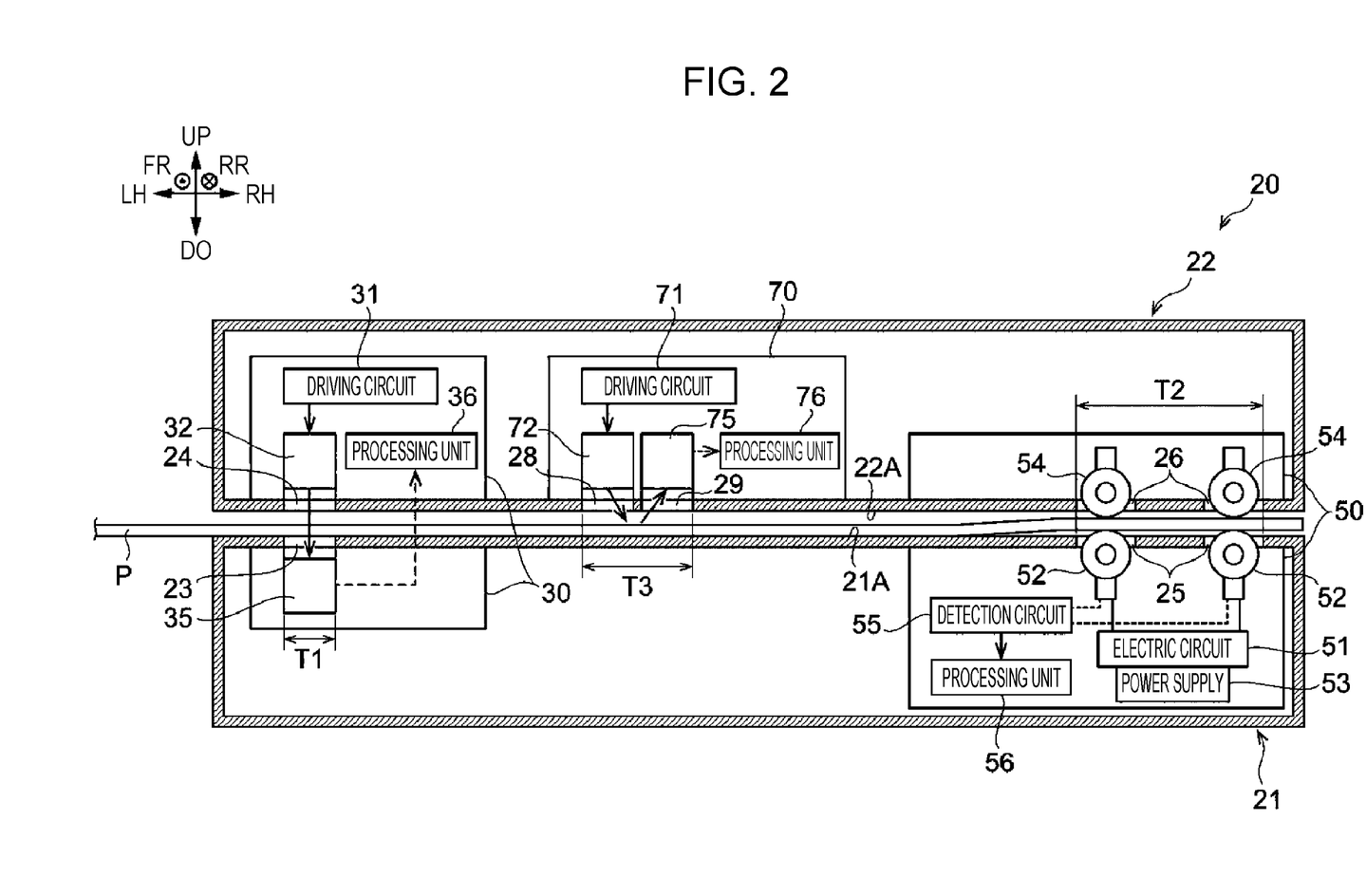
FIG. 2 is a schematic diagram illustrating a configuration of a measurement device according to the first exemplary embodiment.

FIG. 2 is a schematic block diagram illustrating a configuration of the measurement device 20 according to the exemplary embodiment. Note that the arrow UP illustrated in the drawing indicates the upward (vertically upward) direction of the device, and the arrow DO indicates the downward (vertically downward) direction of the device. Also, the arrow LH illustrated in the drawing indicates the left-hand direction of the device, and the arrow RH indicates the right-hand direction of the device. Also, the arrow FR illustrated in the drawing indicates the forward direction of the direction, and the arrow RR indicates the rearward direction of the device. These directions have been defined for convenience in the following description, and the device configuration is not limited to these directions. Note that each direction of the device may be indicated while omitting the word "device" in some cases. In other words, for example, the "upward direction of the device" may simply be referred to as the "upward direction" in some cases.

Also, in the following description, the "vertical direction" is used to mean "both the upward direction and the downward direction" or "either the upward direction or the downward direction" in some cases. The "transverse direction" is used to mean "both the left-hand direction and the right-hand direction" or "either the left-hand direction or the right-hand direction" in some cases. The "transverse direction" may also be referred to as the horizontal or lateral direction. The "longitudinal direction" is used to mean "both the forward direction and the rearward direction" or "either the forward direction or the rearward direction" in some cases. The "longitudinal direction" may also be referred to as the horizontal or lateral direction. Also, the vertical direction, the transverse direction, and the longitudinal direction are mutually intersecting directions (specifically, orthogonal directions).

Also, the symbol of an "x" inside a circle "○" denotes an arrow going into the page. Also, the symbol of a dot "•" inside a circle "○" denotes an arrow coming out of the page.

The measurement device 20 is a device that measures physical properties of the paper P used in the image forming apparatus 10. Specifically, the measurement device 20 measures the basis weight, the electrical resistance, and the presence or absence of a coating layer of the paper P. The paper P is an example of a "sheet-like measurement target". "Sheet-like" refers to a shape similar to paper, and is a concept that includes shapes referred to as film-like or plate-like.

The basis weight, the electrical resistance, and the presence or absence of a coating layer are each an example of a "physical property". Note that "measurement" means measuring a value (that is, the degree) of a physical property, and the value of a physical property is a concept that includes 0 (zero). In other words, "measurement" includes measuring whether or not the value of a physical property is 0 (zero), that is, measuring whether or not a physical property is present.

Specifically, as illustrated in FIG. 2, the measurement device 20 is provided with a first housing 21, a second housing 22, a basis weight measurement unit 30, a resistance measurement unit 50, and a coating layer measurement unit 70. Hereinafter, each unit of the measurement device 20 will be described.

(First Housing 21)

The first housing 21 is a portion in which some of the components of the measurement device 20 are provided. The first housing 21 forms the portion on the downward side of the measurement device 20. The first housing 21 has an opposing surface 21A that faces the bottom surface of the paper P. The opposing surface 21A is also a support surface that supports the paper P from underneath. Inside the first housing 21, a portion of the basis weight measurement unit 30 and a portion of the resistance measurement unit 50 are disposed.

(Second Housing 22)

The second housing 22 is a portion in which some other components of the measurement device 20 are provided. The second housing 22 forms the portion on the upward side of the measurement device 20. The second housing 22 has an opposing surface 22A that faces the top surface of the paper P. Inside the second housing 22, another portion of the basis weight measurement unit 30, the coating layer measurement unit 70, and another portion of the resistance measurement unit 50 are disposed. In the measurement device 20, the paper P given as one example of a measurement target is disposed between the first housing 21 and the second housing 22.

Note that the second housing 22 is configured to be movable relative to the first housing 21 in an approaching or retreating direction (specifically, the vertical direction), and after the paper P is disposed between the first housing 21 and the second housing 22, the second housing 22 is moved relatively in the direction approaching the first housing 21 and positioned at the position illustrated in FIG. 2.

(Basis Weight Measurement Unit 30)

The basis weight measurement unit 30 illustrated in FIG. 2 includes a function of measuring the basis weight [g/m$^2$] of the paper P by causing the paper P to vibrate using an ultrasonic wave. The basis weight measurement unit 30 is an example of a "first measurement unit". The basis weight is an example of a "first physical property". Specifically, as illustrated in FIG. 2, the basis weight measurement unit 30 includes a driving circuit 31, an emission unit 32, a reception unit 35, and a processing unit 36.

The emission unit 32 includes a function of emitting an ultrasonic wave at the paper P. The emission unit 32 is disposed in the second housing 22. Namely, the emission unit 32 is disposed at a position facing one surface (specifically, the top surface) of the paper P. Note that an opening 24 allowing the ultrasonic wave from the emission unit 32 to pass through toward the paper P is formed underneath the emission unit 32 in the second housing 22.

The driving circuit 31 is a circuit that drives the emission unit 32. By causing the driving circuit 31 to drive the emission unit 32, the emission unit 32 imparts an ultrasonic wave to the top surface of the paper P, causing the paper P to vibrate. The vibrating paper P causes air underneath the paper P to vibrate. In other words, the ultrasonic wave from the emission unit 32 is transmitted through the paper P.

The reception unit 35 includes a function of receiving the ultrasonic wave transmitted through the paper P. The reception unit 35 is disposed in the first housing 21. Namely, the reception unit 35 is disposed at a position facing the other surface (specifically, the bottom surface) of the paper P. The reception unit 35 generates a reception signal by receiving the ultrasonic wave transmitted through the paper P. Note that an opening 23 allowing the ultrasonic wave from the paper P to pass through toward the reception unit 35 is formed above the reception unit 35 in the first housing 21.

In this way, in the basis weight measurement unit 30, the emission unit 32 and the reception unit 35 form a detector (specifically, a detection sensor) that detects information (specifically, the ultrasonic wave transmitted through the paper P) indicating the basis weight of the paper P. The driving circuit 31 forms a circuit that drives the detector.

The processing unit 36 obtains a measured value by performing a process such as amplification on the reception signal acquired from the reception unit 35. Furthermore, the processing unit 36 outputs measured value information indicating the obtained measured value to the user terminal 19. The processing unit 36 is configured by an electric circuit including an amplification circuit or the like, for example.

The measured value obtained by the processing unit 36 is a value correlated with the basis weight of the paper P. Consequently, measurement in the basis weight measurement unit 30 includes not only the case of measuring the basis weight itself of the paper P, but also the case of measuring a measurement value correlated with the basis weight of the paper P.

Note that in the basis weight measurement unit 30, the basis weight of the paper P may also be calculated on the basis of the measured value obtained by the processing unit 36. Specifically, the basis weight measurement unit 30 calculates the basis weight from correlation data indicating the correlation between the measured value and the basis weight, for example.

(Resistance Measurement Unit 50)

The resistance measurement unit 50 illustrated in FIG. 2 includes a function of measuring the sheet resistance value [Ω] of the paper P. The resistance measurement unit 50 is an example of a "second measurement unit". The sheet resistance value is an example of a "second physical property other than the first physical property". Specifically, as illustrated in FIG. 2, the resistance measurement unit 50 includes an electric circuit 51, a pair of terminals 52, a power supply 53, a pair of opposing members 54, a detection circuit 55, and a processing unit 56.

The pair of terminals 52 are disposed in the first housing 21, for example. The pair of terminals 52 are spaced from each other by an interval in the transverse direction, and contact the bottom surface of the paper P through an opening 25 formed in the first housing 21. Each of the pair of terminals 52 is electrically connected to the power supply 53 through the electric circuit 51.

Each of the pair of opposing members 54 opposes a corresponding one of the pair of terminals 52, with the paper P disposed between the pair of opposing members 54 and the pair of terminals 52. Each of the pair of opposing members 54 contacts the top surface of the paper P through an opening 26 formed in the second housing 22. In other words, the paper P is pinched between each of the pair of opposing members 54 and each of the pair of terminals 52. As an example, each of the pair of opposing members 54 and each of the pair of terminals 52 are configured as rollers.

The power supply 53 applies a predetermined voltage [V] to the pair of terminals 52 through the electric circuit 51. With this arrangement, a current corresponding to the sheet resistance of the paper P flows between the pair of terminals 52. The detection circuit 55 is electrically connected to the pair of terminals 52. The detection circuit 55 generates a detection signal by detecting the current flowing between the pair of terminals 52.

In this way, in the resistance measurement unit 50, the pair of terminals 52 and the detection circuit 55 form a detector (specifically, a detection sensor) that detects information (specifically, the current flowing through the paper P) indicating the sheet resistance of the paper P. The electric circuit 51 forms a circuit that drives the detector.

The processing unit 56 obtains a measured value (specifically, a current value [A]) by performing a process such as amplification on the detection signal acquired from the detection circuit 55. Furthermore, the processing unit 56 outputs measured value information indicating the obtained measured value to the user terminal 19. The processing unit 56 is configured by an electric circuit including an amplification circuit or the like, for example.

The measured value obtained by the processing unit 56 is a value correlated with the sheet resistance value of the paper P. Consequently, measurement in the resistance measurement unit 50 includes not only the case of measuring the sheet resistance value itself of the paper P, but also the case of measuring a measurement value correlated with the sheet resistance value of the paper P. Note that in the resistance measurement unit 50, the sheet resistance value of the paper P may also be calculated on the basis of the measured value obtained by the processing unit 56.

Note that the resistance measurement unit 50 is configured to obtain the sheet resistance value by applying a predetermined voltage to the pair of terminals 52 and detecting the current flowing between the pair of terminals 52, but is not limited thereto. For example, the resistance measurement unit 50 may also be configured to obtain the sheet resistance value by passing a current with a predetermined current value through the pair of terminals 52 and detecting the voltage across the pair of terminals 52.

(Coating Layer Measurement Unit 70)

The coating layer measurement unit 70 illustrated in FIG. 2 includes a function of measuring the presence or absence of a coating layer of the paper P. A coating layer is a layer formed by applying a coating agent to the surface of paper. In other words, the coating layer measurement unit 70 measures whether or not the paper P is paper with a coating (that is, coated paper).

The coating layer measurement unit 70 is an example of a "disposed unit" and an example of a "third measurement unit". The presence or absence of a coating layer is an example of a "third physical property other than the first physical property and the second physical property". Specifically, as illustrated in FIG. 2, the coating layer measurement unit 70 includes a driving circuit 71, a light irradiation unit 72, a light reception unit 75, and a processing unit 76. The light irradiation unit 72 is an example of an "irradiation unit".

The light irradiation unit 72 includes a function of irradiating the paper P with light. The light irradiation unit 72 is disposed in the second housing 22. Namely, the light irradiation unit 72 is disposed at a position facing one surface (specifically, the top surface) of the paper P with a gap in between. Note that an opening 28 allowing the light from the light irradiation unit 72 to pass through toward the paper P is formed underneath the light irradiation unit 72 in the second housing 22.

The driving circuit 71 is a circuit that drives the light irradiation unit 72. By causing the driving circuit 71 to drive the light irradiation unit 72, the light irradiation unit 72 irradiates the paper P with light, and the light reflects off the paper P.

The light reception unit 75 includes a function of receiving reflected light that has reflected off the paper P. The light reception unit 75 is disposed in the second housing 22. Namely, the light reception unit 75 is disposed at a position facing one surface (specifically, the top surface) of the paper P with a gap in between. The light reception unit 75 generates a light reception signal by receiving the reflected light that has reflected off the paper P. Note that an opening 29 is formed underneath the reception unit 75 in the second housing 22.

In this way, in the coating layer measurement unit 70, the light irradiation unit 72 and the light reception unit 75 form a detector (specifically, a detection sensor) that detects information (specifically, the reflected light reflected off the paper P) indicating the presence or absence of a coating layer of the paper P. The driving circuit 71 forms a circuit that drives the detector.

The processing unit 76 obtains a measured value by performing a process such as amplification on the light reception signal acquired from the light reception unit 75. Furthermore, the processing unit 76 outputs measured value information indicating the obtained measured value to the user terminal 19. The processing unit 76 is configured by an electric circuit including an amplification circuit or the like, for example.

The measured value obtained by the processing unit 76 is a value correlated with the presence or absence of a coating layer of the paper P. Consequently, measurement in the coating layer measurement unit 70 includes not only the case of measuring the presence or absence of a coating layer itself of the paper P, but also the case of measuring a measurement value correlated with the presence or absence of a coating layer of the paper P.

Note that in the coating layer measurement unit 70, the presence or absence of a coating layer of the paper P may also be measured on the basis of the measured value obtained by the processing unit 76. Specifically, the presence or absence of a coating layer is measured according to whether or not the measured value exceeds a predetermined threshold, for example.

(Arrangement of Basis Weight Measurement Unit 30, Resistance Measurement Unit 50, and Coating Layer Measurement Unit 70)

At this point, the arrangement of the basis weight measurement unit 30, the resistance measurement unit 50, and the coating layer measurement unit 70 will be described.

As illustrated in FIG. 2, the basis weight measurement unit 30 is disposed at one end (specifically, the left end) of the first housing 21 and the second housing 22. The basis weight measurement unit 30 is disposed at an opposing position T1 facing a portion (specifically, the left-hand portion) of the paper P.

Specifically, in the basis weight measurement unit 30, the emission unit 32 faces one surface (specifically, the top surface) of the paper P at the opposing position T1 with a gap in between. Also, the reception unit 35 faces the other surface (specifically, the bottom surface) of the paper P at the opposing position T1 with a gap in between. The opposing position T1 is an example of a "first opposing position".

Note that the emission unit 32 is disposed at a position receded upward from the opposing surface 22A of the second housing 22. Also, the reception unit 35 is disposed at a position receded downward from the opposing surface 21A of the first housing 21.

In this way, the basis weight measurement unit 30 faces the paper P at the opposing position T1 with a gap in between, and does not contact either surface of the paper P. Consequently, at the opposing position T1, the paper P is in an unrestrained, free state. For this reason, the paper P vibrates in response to the application of an ultrasonic wave.

The resistance measurement unit 50 is disposed at the other end (specifically, the right end) of the first housing 21 and the second housing 22. The resistance measurement unit 50 is disposed at an opposing position T2 where, in a state in which the basis weight measurement unit 30 faces one portion (specifically, the left-hand portion) of the paper P, the resistance measurement unit 50 faces another portion (specifically, the right-hand portion) of the paper P. In other words, both the resistance measurement unit 50 and the basis weight measurement unit 30 are disposed to fit within the sheet size of the paper P.

Specifically, in the resistance measurement unit 50, each of the pair of opposing members 54 and each of the pair of terminals 52 pinches and restrains the other portion (specifically, the right-hand portion) of the paper P at the opposing position T2. The opposing position T2 is an example of a "second opposing position".

Note that each of the pair of terminals 52 is disposed at a position projecting farther upward than the opposing surface 21A of the first housing 21. Also, each of the pair of opposing members 54 is disposed at a position projecting farther downward than the opposing surface 22A of the second housing 22.

The coating layer measurement unit 70 is disposed between the basis weight measurement unit 30 and the resistance measurement unit 50 in the transverse direction. Consequently, the coating layer measurement unit 70 is disposed together with the resistance measurement unit 50 and the basis weight measurement unit 30 to fit within the sheet size of the paper P. In the exemplary embodiment, the coating layer measurement unit 70 is disposed between the basis weight measurement unit 30 and the resistance measurement unit 50 as viewed from each of the longitudinal direction and the vertical direction. Note that the transverse direction is an example of an "intersecting direction with respect to the thickness direction of the measurement target".

Specifically, in the coating layer measurement unit 70, the light irradiation unit 72 and the light reception unit 75 are disposed at an intermediate position T3 between the emission unit 32 and the reception unit 35 of the basis weight measurement unit 30 and the pair of opposing members 54 and the pair of terminals 52 of the resistance measurement unit 50 in the transverse direction.

Note that the light irradiation unit 72 and the light reception unit 75 is disposed at a position receded upward from the opposing surface 22A of the second housing 22. Consequently, the light irradiation unit 72 irradiates the top surface of the paper P with light without contacting the paper P in a state in which the bottom surface of paper P is supported by the opposing surface 21A of the first housing 21. Also, the light reception unit 75 receives reflected light from the top surface of the paper P without contacting the paper P in a state in which the bottom surface of paper P is supported by the opposing surface 21A of the first housing 21.

Note that the bottom surface of the paper P is an example of a "surface on one side in the thickness direction of the measurement target". Also, the top surface of the paper P is an example of a "surface on the other side in the thickness direction of the measurement target".

As above, the paper P is in an unrestrained, free state at the opposing position T1. On the other hand, at the opposing position T2, the paper P is pinched and restrained by the resistance measurement unit 50. Furthermore, at the intermediate position T3, the bottom surface of the paper P is supported by the opposing surface 21A of the first housing 21 while the top surface is free of contact. Consequently, in the exemplary embodiment, the restraining force on the paper P is progressively stronger at the opposing position T1, the intermediate position T3, and the opposing position T2 in that order.

(Action According to Exemplary Embodiment)

In the exemplary embodiment, the basis weight measurement unit 30 measures the basis weight of the paper P by causing the paper P to vibrate with an ultrasonic wave at the opposing position T1. The vibrations produced at the opposing position T1 in the paper P propagate as noise through the paper P to the resistance measurement unit 50 side (that is, the opposing position T2 side). Hypothetically, if the paper P vibrates at the opposing position T2, a gap may be formed between the pair of terminals 52 and the paper P, and the measurement by the resistance measurement unit 50 may be hindered.

Also, in the exemplary embodiment, the resistance measurement unit 50 pinches and restrains the paper P at the opposing position T2. Hypothetically, if the restraining force on the paper P at the opposing position T2 reaches the opposing position T1, the vibration of the paper P at the opposing position T1 may be limited, and the measurement by the basis weight measurement unit 30 may be hindered.

In the exemplary embodiment, the coating layer measurement unit 70 is disposed between the basis weight measurement unit 30 and the resistance measurement unit 50 in the transverse direction. Consequently, it is possible to separate the basis weight measurement unit 30 and the resistance measurement unit 50 in the transverse direction compared to a configuration in which the basis weight measurement unit 30 and the resistance measurement unit 50 are adjacent to each other (hereinafter referred to as Configuration A). For this reason, in the exemplary embodiment, vibrations occurring in the paper P at the opposing position T1 do not propagate to the opposing position T2 as easily, thereby keeping the vibrations generated by the basis weight measurement unit 30 from hindering the measurement by the resistance measurement unit 50 compared to Configuration A. In other words, in the exemplary embodiment, measurement error by the resistance measurement unit 50 is reduced compared to Configuration A.

Also, in the exemplary embodiment, the restraining force on the paper P at the opposing position T2 does not propagate to the opposing position T1 as easily compared to Configuration A. Consequently, vibrations in the paper P at the opposing position T1 are less restricted and the hindrance to the measurement by the basis weight measurement unit 30 is reduced compared to Configuration A. In other words, in the exemplary embodiment, measurement error by the basis weight measurement unit 30 is reduced compared to Configuration A.

Also, in the exemplary embodiment, because the coating layer measurement unit 70 is used as an example of a disposed unit that is disposed between the basis weight measurement unit 30 and the resistance measurement unit 50, it is possible to measure the presence or absence of a coating layer of the paper P while also reducing the hindrance to the measurements by the resistance measurement unit 50 and the basis weight measurement unit 30 compared to a configuration using a disposed unit that lacks a measurement function of measuring a physical property of the paper P.

Also, in the exemplary embodiment, the light irradiation unit 72 of the coating layer measurement unit 70 irradiates the top surface of the paper P with light without contacting the paper P in a state in which the bottom surface of paper P is supported by the opposing surface 21A of the first housing 21. Consequently, vibrations in the paper P at the opposing position T1 are less restricted and the hindrance to the measurement by the basis weight measurement unit 30 is reduced compared to a configuration in which the light irradiation unit 72 contacts the top surface of the paper P.

Also, in the exemplary embodiment, the control device 16 acquires the image formation instruction from the user terminal 19 and causes the image forming unit 14 and the conveyance mechanism 15 to execute image formation operations while also controlling the operations of the image forming unit 14 and the conveyance mechanism 15 on the basis of the measured value information.

Consequently, a high-quality image is formed on the paper P compared to a configuration in which the image forming operations are executed irrespectively of the physical properties of the paper P.

Second Exemplary Embodiment

Figure 3:
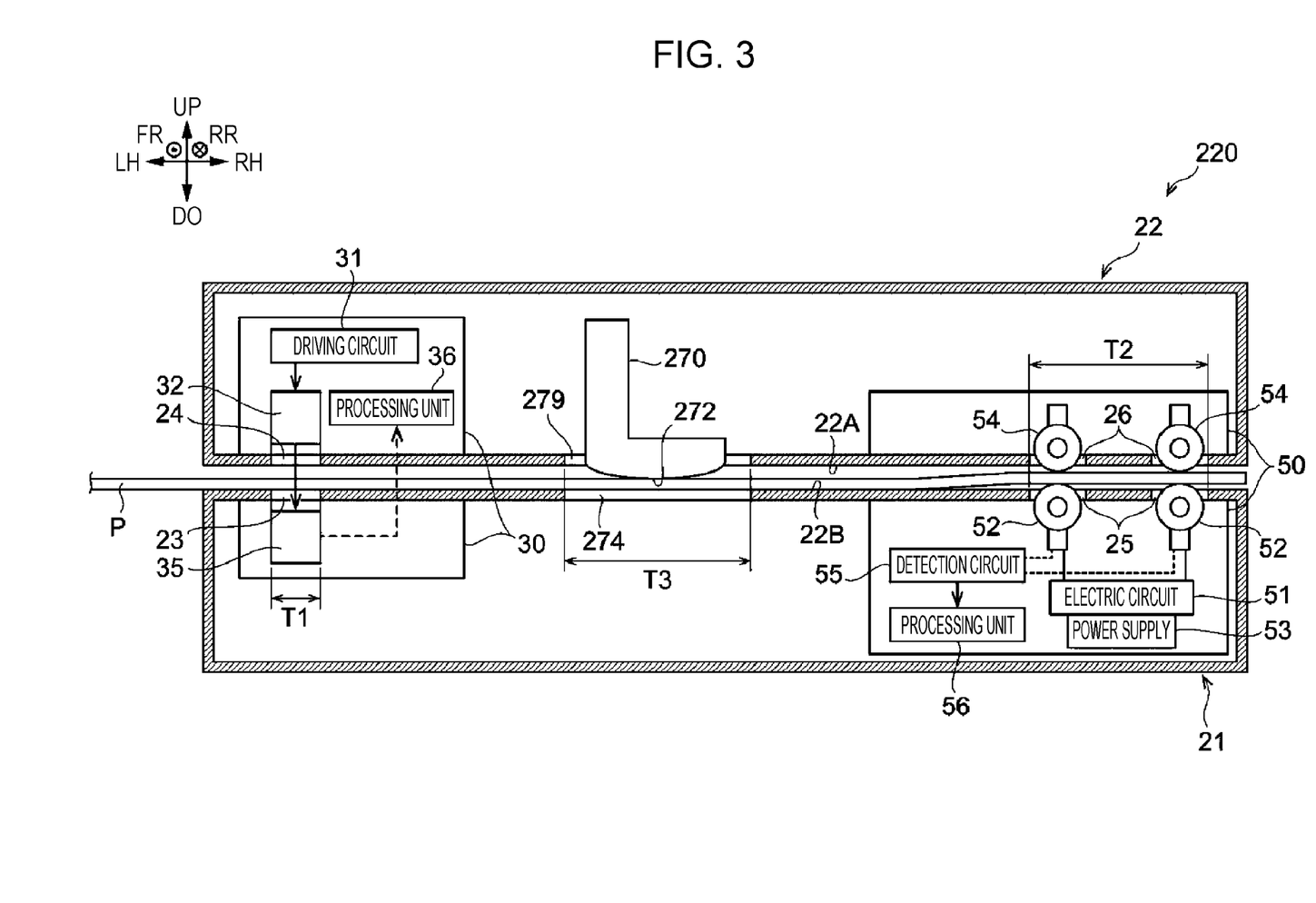
FIG. 3 is a schematic diagram illustrating a configuration of a measurement device according to a second exemplary embodiment.

Next, a measurement device 220 according to a second exemplary embodiment will be described. Note that portions having the same functions as the first exemplary embodiment are denoted with the same signs, and a description of such portions is reduced or omitted appropriately.

As illustrated in FIG. 3, the measurement device 220 is provided with a contact member 270 instead of the coating layer measurement unit 70. The contact member 270 is L-shaped as viewed in the longitudinal direction.

The contact member 270 is disposed between the basis weight measurement unit 30 and the resistance measurement unit 50 in the transverse direction. Consequently, the contact member 270 is disposed together with the resistance measurement unit 50 and the basis weight measurement unit 30 to fit within the sheet size of the paper P. In the exemplary embodiment, the contact member 270 is disposed between the basis weight measurement unit 30 and the resistance measurement unit 50 as viewed from each of the longitudinal direction and the vertical direction.

Specifically, the contact member 270 is disposed at an intermediate position T3 between the emission unit 32 and the reception unit 35 of the basis weight measurement unit 30 and the pair of opposing members 54 and the pair of terminals 52 of the resistance measurement unit 50 in the transverse direction.

The contact member 270 projects downward past the opposing surface 22A of the second housing 22 through an opening 279 formed in the second housing 22. With this arrangement, a bottom surface 272 of the contact member 270 is positioned farther downward than the opposing surface 22A of the second housing 22 and contacts the top surface of the paper P. In other words, the contact member 270 contacts the paper P between the opposing position T1 and the opposing position T2.

Furthermore, in the exemplary embodiment, an opening 274 is formed in the opposing surface 21A of the first housing 21 at the intermediate position T3. Consequently, the bottom surface of the paper P is free of contact at the intermediate position T3. In this way, in the exemplary embodiment, the contact member 270 contacts the top surface of the paper P but does not contact the bottom surface of the paper P. Besides the above points, the measurement device 220 is configured similarly to the measurement device 20.

Note that in the exemplary embodiment, the top surface of the paper P is an example of a "surface on one side in the thickness direction of the measurement target". Also, the bottom surface of the paper P is an example of a "surface on the other side in the thickness direction of the measurement target".

(Action According to Exemplary Embodiment)

In the exemplary embodiment, the contact member 270 is disposed between the basis weight measurement unit 30 and the resistance measurement unit 50 in the transverse direction. Consequently, it is possible to separate the basis weight measurement unit 30 and the resistance measurement unit 50 in the transverse direction compared to a configuration in which the basis weight measurement unit 30 and the resistance measurement unit 50 are adjacent to each other (hereinafter referred to as Configuration A). For this reason, in the exemplary embodiment, vibrations occurring in the paper P at the opposing position T1 do not propagate to the opposing position T2 as easily, thereby keeping the vibrations generated by the basis weight measurement unit 30 from hindering the measurement by the resistance measurement unit 50 compared to Configuration A. In other words, in the exemplary embodiment, measurement error by the resistance measurement unit 50 is reduced compared to Configuration A.

Also, in the exemplary embodiment, the restraining force on the paper P at the opposing position T2 does not propagate to the opposing position T1 as easily compared to Configuration A. Consequently, vibrations in the paper P at the opposing position T1 are less restricted and the hindrance to the measurement by the basis weight measurement unit 30 is reduced compared to Configuration A. In other words, in the exemplary embodiment, measurement error by the basis weight measurement unit 30 is reduced compared to Configuration A.

Also, in the exemplary embodiment, because the contact member 270 contacts the paper P at the opposing position T1 and the opposing position T2, vibrations occurring in the paper P at the opposing position T1 do not propagate to the opposing position T2 as easily, thereby keeping the vibrations generated by the basis weight measurement unit 30 from hindering the measurement by the resistance measurement unit 50 compared to a configuration in which the contact member 270 does not contact the paper P.

Also, because the contact member 270 does not contact the bottom surface of the paper P, vibrations in the paper P at the opposing position T1 are less restricted and the hindrance to the measurement by the basis weight measurement unit 30 is reduced compared to a configuration in which the contact member 270 contacts the top and bottom surfaces of the paper P.

Third Exemplary Embodiment

Figure 4:
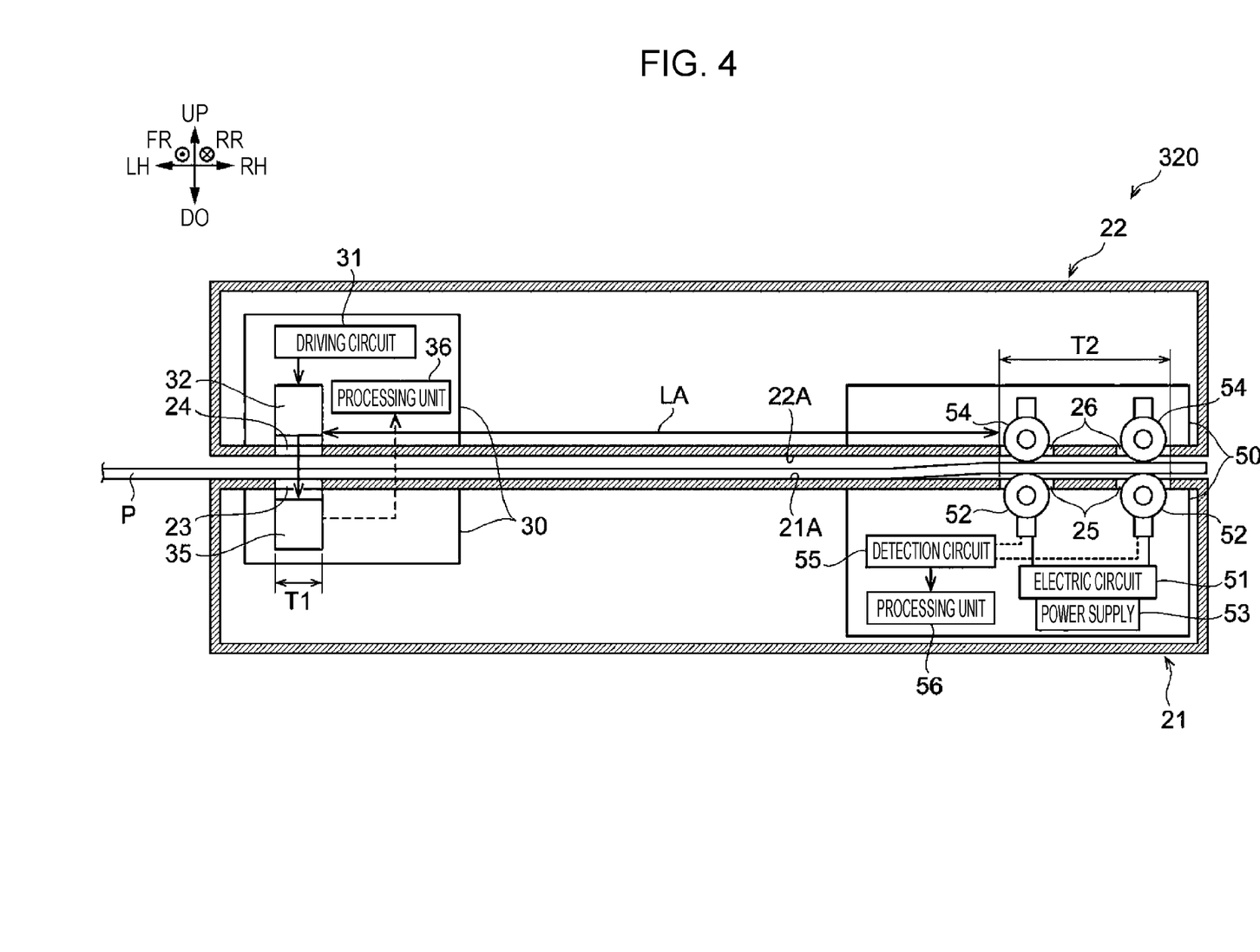
FIG. 4 is a schematic diagram illustrating a configuration of a measurement device according to a third exemplary embodiment.

Next, a measurement device 320 according to a third exemplary embodiment will be described. Note that portions having the same functions as the first exemplary embodiment are denoted with the same signs, and a description of such portions is reduced or omitted appropriately.

As illustrated in FIG. 4, the measurement device 320 is not provided with the coating layer measurement unit 70. Furthermore, in the measurement device 320, the distance LA between the opposing position T1 and the opposing position T2 is set to a distance at which vibrations in the left-hand portion of the paper P at the opposing position T1 attenuate in the right-hand portion, such that the restrained state in the right-hand portion of the paper P at the opposing position T2 is maintained.

In other words, the distance LA is set such that the restrained state in the right-hand portion of the paper P at the opposing position T2 is the same for both the case of generating vibrations and the case of not generating vibrations at the opposing position T1. The restrained state in the right-hand portion of the paper P is confirmed by the load between each of the pair of opposing members 54 and each of the pair of terminals 52 with respect to the paper P, for example.

Also, in the exemplary embodiment, to set the distance LA to the distance described above, the basis weight measurement unit 30 is disposed at one end (specifically, the left end) of the first housing 21 and the second housing 22, and the resistance measurement unit 50 is disposed at the other end (specifically, the right end) of the first housing 21 and the second housing 22.

Also, the basis weight measurement unit 30 is disposed by a portion on one end (specifically, the left-hand portion) of the paper P, and the resistance measurement unit 50 is disposed by a portion on the other end (specifically, the right-hand portion) of the paper P.

Furthermore, the emission unit 32 and the reception unit 35 are disposed in a left-hand portion of the basis weight measurement unit 30. In other words, the emission unit 32 and the reception unit 35 are disposed to the left of center in the transverse direction in the basis weight measurement unit 30.

Also, the pair of opposing members 54 and the pair of terminals 52 are disposed in right-hand portion of the resistance measurement unit 50. In other words, the pair of opposing members 54 and the pair of terminals 52 are disposed to the right of center in the transverse direction in the resistance measurement unit 50.

(Action According to Exemplary Embodiment)

As described above, in the exemplary embodiment, the distance LA between the opposing position T1 and the opposing position T2 is set to a distance at which vibrations in the left-hand portion of the paper P at the opposing position T1 attenuate in the right-hand portion, such that the restrained state in the right-hand portion of the paper P at the opposing position T2 is maintained.

Consequently, vibrations generated by the basis weight measurement unit 30 are kept from hindering the measurement by the resistance measurement unit 50 compared to a configuration in which the right-hand portion of the paper P at the opposing position T2 vibrates due to vibrations in the left-hand portion of the paper P at the opposing position T1. In other words, in the exemplary embodiment, measurement error in the resistance measurement unit 50 is reduced compared to a configuration in which the right-hand portion of the paper P at the opposing position T2 vibrates due to vibrations in the left-hand portion of the paper P at the opposing position T1.

Fourth Exemplary Embodiment

Figure 5:
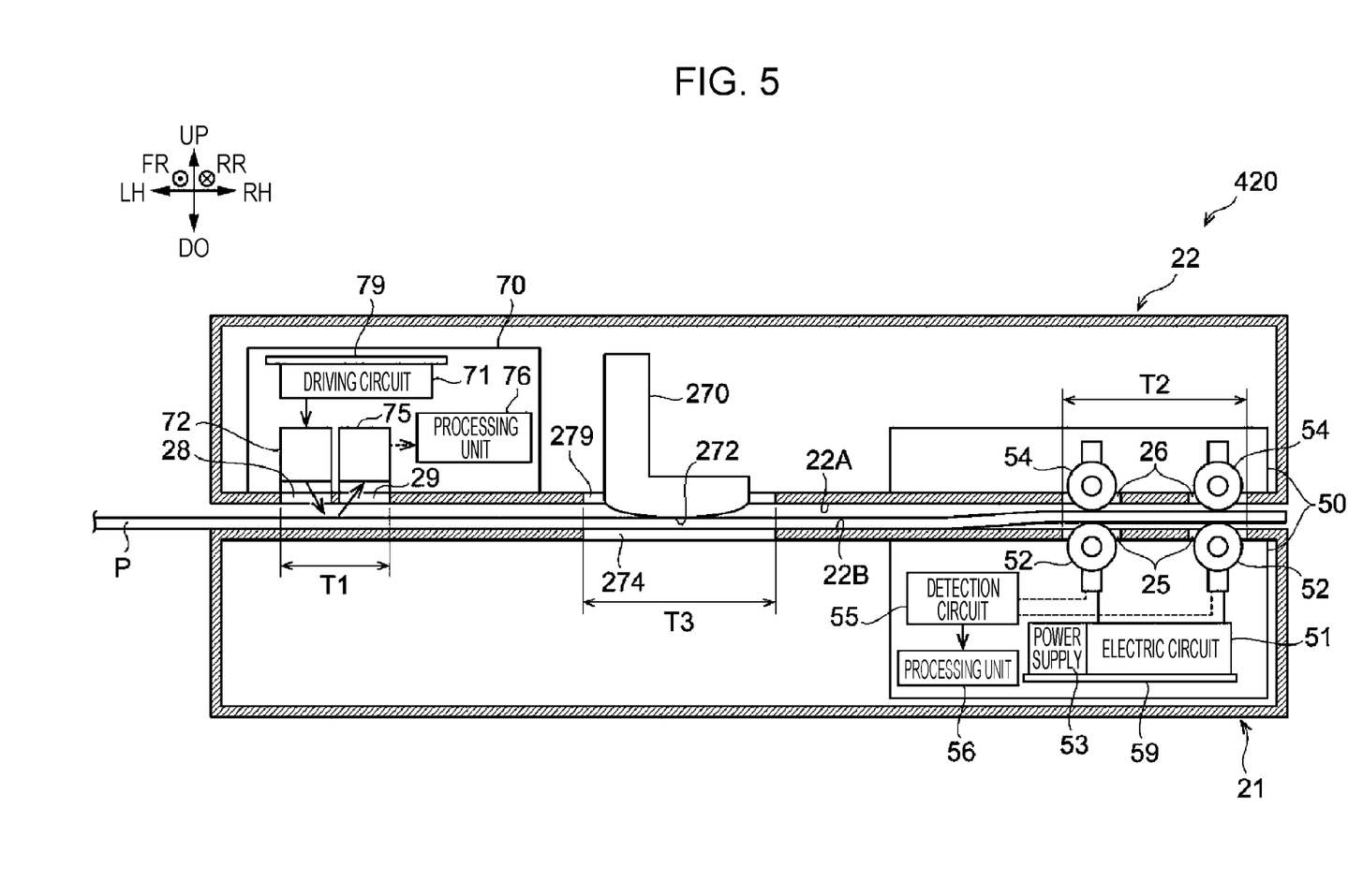
FIG. 5 is a schematic diagram illustrating a configuration of a measurement device according to a fourth exemplary embodiment.

Next, a measurement device 420 according to a fourth exemplary embodiment will be described. Note that portions having the same functions as the second exemplary embodiment are denoted with the same signs, and a description of such portions is reduced or omitted appropriately.

As illustrated in FIG. 5, the measurement device 420 is provided with the coating layer measurement unit 70 instead of the basis weight measurement unit 30 The coating layer measurement unit 70 is disposed at one end (specifically, the left end) of the first housing 21 and the second housing 22. The coating layer measurement unit 70 is disposed at an opposing position T1 facing a portion (specifically, the left-hand portion) of the paper P.

Specifically, in the coating layer measurement unit 70, the light irradiation unit 72 and the light reception unit 75 are disposed at a position receded upward from the opposing surface 22A of the second housing 22 at the opposing position T1. Consequently, the light irradiation unit 72 irradiates the top surface of the paper P with light without contacting the paper P in a state in which the bottom surface of paper P is supported by the opposing surface 21A of the first housing 21. Also, the light reception unit 75 receives reflected light from the top surface of the paper P without contacting the paper P in a state in which the bottom surface of paper P is supported by the opposing surface 21A of the first housing 21.

In the exemplary embodiment, the driving circuit 71 of the coating layer measurement unit 70 is provided on a board 79. On the other hand, the electric circuit 51 and the power supply 53 of the resistance measurement unit 50 are provided on a board 59. In other words, the driving circuit 71 of the coating layer measurement unit 70 and the electric circuit 51 and the power supply 53 of the resistance measurement unit 50 are provided on different boards.

Also, the driving circuit 71 of the coating layer measurement unit 70 is disposed above the paper P, while the electric circuit 51 and the power supply 53 of the resistance measurement unit 50 are disposed below the paper P. Consequently, the driving circuit 71 of the coating layer measurement unit 70 and the electric circuit 51 and the power supply 53 of the resistance measurement unit 50 are disposed at positions partitioned by the paper P in addition to the first housing 21 and the second housing 22.

In the exemplary embodiment, the contact member 270 is disposed between the coating layer measurement unit 70 and the resistance measurement unit 50 in the transverse direction. Consequently, the contact member 270 is disposed together with the coating layer measurement unit 70 and the resistance measurement unit 50 to fit within the sheet size of the paper P. In the exemplary embodiment, the contact member 270 is disposed between the coating layer measurement unit 70 and the resistance measurement unit 50 as viewed from each of the longitudinal direction and the vertical direction.

Specifically, the contact member 270 is disposed at an intermediate position T3 between the light irradiation unit 72 and the light reception unit 75 of the coating layer measurement unit 70 and the pair of opposing members 54 and the pair of terminals 52 of the resistance measurement unit 50 in the transverse direction.

Note that in the exemplary embodiment, the coating layer measurement unit 70 is an example of "one measurement unit". The presence or absence of a coating layer is an example of "one physical property". The resistance measurement unit 50 is an example of an "other measurement unit". The sheet resistance value is an example of an "other physical property". The driving circuit 71 is an example of a "first driving circuit". The driving circuit 51 is an example of a "second driving circuit".

(Action According to Exemplary Embodiment)

In the exemplary embodiment, the driving circuit 71 of the coating layer measurement unit 70 and the electric circuit 51 and the power supply 53 of the resistance measurement unit 50 are provided on different boards. Consequently, the influence of noise between the driving circuit 71 and the electric circuit 51 is reduced compared to a configuration in which the driving circuit 71 and the electric circuit 51 are provided on the same board (hereinafter referred to as Configuration B). With this arrangement, noise from the driving circuit 71 is kept from hindering the measurement by the resistance measurement unit 50 and noise from the electric circuit 51 is kept from hindering the measurement by the coating layer measurement unit 70 compared to Configuration B.

Also, in the exemplary embodiment, the driving circuit 71 of the coating layer measurement unit 70 is disposed above the paper P, while the electric circuit 51 and the power supply 53 of the resistance measurement unit 50 are disposed below the paper P. Consequently, it is possible to separate the driving circuit 71 and the electric circuit 51 vertically and also use the paper P as a partition between the driving circuit 71 and the electric circuit 51 compared to a configuration in which both the driving circuit 71 and the electric circuit 51 are disposed on one side (for example, the top side of the paper P) in the thickness direction with respect to the paper P (hereinafter referred to as Configuration C). With this arrangement, noise from the driving circuit 71 is kept from hindering the measurement by the resistance measurement unit 50 and noise from the electric circuit 51 is kept from hindering the measurement by the coating layer measurement unit 70 compared to Configuration C.

Also, in the exemplary embodiment, the contact member 270 is disposed between the coating layer measurement unit 70 and the resistance measurement unit 50 in the transverse direction. Consequently, it is possible to separate the coating layer measurement unit 70 and the resistance measurement unit 50 in the transverse direction and also use the contact member 270 as a partition between the driving circuit 71 and the electric circuit 51 compared to a configuration in which the coating layer measurement unit 70 and the resistance measurement unit 50 are adjacent to each other (hereinafter referred to as Configuration D). With this arrangement, noise from the driving circuit 71 is kept from hindering the measurement by the resistance measurement unit 50 and noise from the electric circuit 51 is kept from hindering the measurement by the coating layer measurement unit 70 compared to Configuration D.

(Exemplary Modifications)

In the first to fourth exemplary embodiments, the paper P is used as an example of a sheet-like measurement target, but the measurement target is not limited thereto. The measurement target may also be a sheet-like recording medium other than the paper P, such as a metal or plastic film for example, and any sheet-like member may be used.

In the first to third exemplary embodiments, the basis weight measurement unit 30 that measures the basis weight [$g/m^2$] of the paper P is used as an example of a first measurement unit, but the first measurement unit is not limited thereto. As an example of the first measurement unit, a measurement unit that measures the thickness [m], the density [$g/m^3$], the mass [g], or some other physical property of a measurement target may also be used. In other words, as an example of a first physical property, the thickness [m], the density [$g/m^3$], the mass [g], or some other physical property of a measurement target may also be used, for example.

In the first to third exemplary embodiments, the resistance measurement unit 50 that measures the sheet resistance value of the paper P is used as an example of a second measurement unit, but the second measurement unit is not limited thereto. As an example of the second measurement unit, a measurement unit that measures the volume resistance or some other physical property of a measurement target may also be used. In other words, as an example of a second physical property, the volume resistance or some other physical property of a measurement target may also be used, for example. Note that in the case of measuring the volume resistance of the paper P, one of the pair of terminals 52 is disposed on the top side of the paper P while the other is disposed on the bottom side of the paper P, such that the pair of terminals 52 pinch and restrain the paper P in the vertical direction.

In the first exemplary embodiment, the coating layer measurement unit 70 that measures the presence or absence of a coating layer of the paper P is used as an example of a third measurement unit, but the third measurement unit is not limited thereto. As an example of the third measurement unit, a measurement unit that measures the moisture content, the strength (that is, rigidity), or some other physical property of a measurement target may also be used. In other words, as an example of a third physical property, the moisture content, the strength (that is, rigidity), or some other physical property of a measurement target may also be used, for example.

Also, the coating layer measurement unit 70 and the contact member 270 given as examples of a disposed unit do not contact one of the surfaces of the paper P, but the disposed unit is not limited thereto. The disposed unit may also be configured to contact both surfaces of the measurement target. Additionally, the disposed unit may also be configured to contact neither surface of the measurement target.

In the fourth exemplary embodiment, the coating layer measurement unit 70 that measures the presence or absence of a coating layer of the paper P is used as an example of a first measurement unit, but the first measurement unit is not limited thereto. The first measurement unit may be any measurement unit provided with a driving circuit, and may also be a measurement unit that measures a physical property other than the presence or absence of a coating layer. In other words, as an example of a first physical property, a physical property other than the presence or absence of a coating layer may also be used, for example.

In the fourth exemplary embodiment, the resistance measurement unit 50 that measures the sheet resistance value of the paper P is used as an example of another measurement unit, but the other measurement unit is not limited thereto.

The other measurement unit may be any measurement unit provided with a driving circuit, and may also be a measurement unit that measures a physical property other than the sheet resistance value. In other words, as an example of another physical property, a physical property other than the sheet resistance value may also be used, for example.

Also, in the fourth exemplary embodiment, the driving circuit 71 of the coating layer measurement unit 70 is disposed above the paper P, while the electric circuit 51 and the power supply 53 of the resistance measurement unit 50 are disposed below the paper P, but the configuration is not limited thereto. For example, both the driving circuit 71 and the electric circuit 51 may also be disposed on one side (for example, the top side of the paper P) in the thickness direction with respect to the paper P.

In the fourth exemplary embodiment, the contact member 270 is disposed between the coating layer measurement unit 70 and the resistance measurement unit 50 in the transverse direction, but the configuration is not limited thereto. For example, the coating layer measurement unit 70 and the resistance measurement unit 50 may also be adjacent to each other in the transverse direction.

The present disclosure is not limited to the exemplary embodiment above, and various modifications, alterations, and improvements are possible without deviating from the gist of the present disclosure. For example, the configurations included in the first to fourth exemplary embodiments and exemplary modifications described above may also be plurally combined where appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A measurement device comprising:
    a first measurement unit, disposed at a first opposing position facing a portion of a sheet-like measurement target, that measures a first physical property of the measurement target by causing the measurement target to vibrate with an ultrasonic wave, wherein the first physical property includes a basis weight of the measurement target;
    a second measurement unit, disposed at a second opposing position facing another portion of the measurement target in a state in which the first measurement unit is facing the first portion, that pinches and restrains the other portion in a thickness direction and measures a second physical property other than the first physical property of the measurement target, wherein the second physical property includes a sheet resistance value of the measurement target; and
    a disposed unit disposed between the first measurement unit and the second measurement unit in an intersecting direction with respect to the thickness direction of the measurement target.
2. The measurement device according to claim 1, wherein:
    the disposed unit contacts the measurement target between the first opposing position and the second opposing position.
3. The measurement device according to claim 2, wherein:
    the disposed unit contacts a surface on one side of the measurement target in the thickness direction, and does not contact a surface on the other side.
4. The measurement device according to claim 1, wherein:
    the disposed unit is a third measurement unit that measures a third physical property other than the first physical property and the second physical property of the measurement target.
5. The measurement device according to claim 2, wherein:
    the disposed unit is a third measurement unit that measures a third physical property other than the first physical property and the second physical property of the measurement target.
6. The measurement device according to claim 3, wherein:
    the disposed unit is a third measurement unit that measures a third physical property other than the first physical property and the second physical property of the measurement target.
7. The measurement device according to claim 4, wherein:
    the third measurement unit includes an irradiation unit that irradiates the surface on the other side of the measurement target in the thickness direction with light in a non-contacting way in a state in which the surface on one side of the measurement target in the thickness direction is supported.
8. The measurement device according to claim 5, wherein:
    the third measurement unit includes an irradiation unit that irradiates the surface on the other side of the measurement target in the thickness direction with light in a non-contacting way in a state in which the surface on one side of the measurement target in the thickness direction is supported.
9. The measurement device according to claim 6, wherein:
    the third measurement unit includes an irradiation unit that irradiates the surface on the other side of the measurement target in the thickness direction with light in a non-contacting way in a state in which the surface on one side of the measurement target in the thickness direction is supported.
10. A measurement device comprising:
    a first measurement unit, disposed at a first opposing position facing a portion of a sheet-like measurement target, that measures a first physical property of the measurement target by causing the measurement target to vibrate with an ultrasonic wave, wherein the first physical property includes a basis weight of the measurement target; and
    a second measurement unit, disposed at a second opposing position facing another portion of the measurement target in a state in which the first measurement unit is facing the first portion, that pinches and restrains the other portion in a thickness direction and measures a second physical property other than the first physical property of the measurement target, wherein
    the second physical property includes a sheet resistance value of the measurement target, and a distance between the first opposing position and the second opposing position is set to a distance at which vibrations in the first portion attenuate in the other portion, such that the restrained state in the other portion is maintained.

11. A measurement device comprising:

a measurement unit, disposed at an opposing position facing a portion of a sheet-like measurement target and driven by a first driving circuit, that measures a physical property of the measurement target, wherein the physical property includes a basis weight of the measurement target; and another measurement unit, disposed at an opposing position facing another portion of the measurement target in a state in which the measurement unit is facing the first portion, and driven by a second driving circuit, that measures another physical property other than the physical property, wherein the another physical property includes a sheet resistance value of the measurement target, and the first driving circuit and the second driving circuit are provided on different boards.

12. The measurement device according to claim 11, wherein:

the first driving circuit is disposed on one side of the measurement target in a thickness direction; and the second driving circuit is disposed on the other side of the measurement target in the thickness direction.

13. The measurement device according to claim 11, further comprising:

a disposed unit disposed between the measurement unit and the other measurement unit in an intersecting direction with respect to the thickness direction of the measurement target.

14. The measurement device according to claim 12, further comprising:

a disposed unit disposed between the measurement unit and the other measurement unit in an intersecting direction with respect to the thickness direction of the measurement target.

15. An image forming apparatus comprising:

the measurement device according to claim 1;

an image forming unit that forms an image on a recording medium treated as the measurement target for which physical properties are measured by the measurement device; and a control device that controls an image forming operation by the image forming unit on a basis of the physical properties measured by the measurement device.

* * * * *